US008317151B1

(12) United States Patent
Koehler

(10) Patent No.: US 8,317,151 B1
(45) Date of Patent: Nov. 27, 2012

(54) MOUNTING BRACKET FOR GPS ANTENNA

(75) Inventor: Michael O. Koehler, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/136,901

(22) Filed: Jul. 28, 2011

(51) Int. Cl.
*A01K 97/01* (2006.01)

(52) U.S. Cl. ........................................ 248/534; 343/878

(58) Field of Classification Search .................. 343/890, 343/892, 898, 713, 715, 872, 878; 248/511, 248/534, 536, 539
See application file for complete search history.

(56) References Cited

U.S. PATENT DOCUMENTS 2,684,399 A * 7/1954 Shanks ..................... 174/137 R
2,790,023 A * 4/1957 Keller ......................... 174/40 R
4,106,024 A * 8/1978 Nijman ......................... 343/715
4,491,846 A * 1/1985 Buse et al. ..................... 343/758
5,456,442 A * 10/1995 Sutton et al. .................. 248/534
5,614,918 A * 3/1997 Dinardo et al. ............... 343/882
5,995,053 A * 11/1999 Curtis ........................... 343/715
6,177,883 B1 * 1/2001 Jennetti et al. ........... 340/870.02
6,617,976 B2 * 9/2003 Walden et al. ........... 340/870.02

* cited by examiner

*Primary Examiner* — Gwendolyn W Baxter
(74) *Attorney, Agent, or Firm* — Gerhard W. Thielman, Esq

(57) ABSTRACT

A bracket is provided for mounting an antenna onto a well disposed on a gun turret. The antenna (for receiving GPS signals) has an exposed dome and a connector extending underneath the dome. The bracket includes a substantially cylindrical housing that contains an internal chamber. The housing has proximal and distal ends along a longitudinal axis. The distal end has a first surface for attaching to the well. A flange disposed at the proximal end provides a surface onto which the antenna mounts. The connector can be inserted into the chamber. A male-threaded boss extends from the distal end to insert into a female-threaded well disposed on the turret.

2 Claims, 3 Drawing Sheets

MOUNTING BRACKET FOR GPS ANTENNA

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to mounting brackets. In particular, this invention relates to mechanisms for attaching a global positioning antenna to a tank turret.

The United States Navy has commissioned two class prototypes for a Littoral Combat Ship (LCS) intended for close shore fire support. In particular, the lead ships for these classes are the steel planing monohull U.S.S. Freedom (LCS-1) designed by Lockheed Martin, and the aluminum trimaran U.S.S. Independence (LCS-2) designed by General Dynamics. The Navy also deploys amphibious transport docks with the lead ship U.S.S. San Antonio (LPD-17). These classes can be reconfigured with interchangeable weapons modules for select plug-and-fight missions.

The Gun Mission Module (GMM) represents an exemplary surface warfare module package and includes two turret-mounted, axis-stabilized chain guns that can fire up to 200 rounds per minute of 30×173 mm ammunition. The GMM includes an Mk 46 weapons system having a gun turret.

Firing control for the GMM requires accurate and current information on relative global position. Such information can be provided by the global positioning system (GPS) that employs orbiting satellites for this purpose. The GPS information can be obtained from the satellite network using a receiver equipped with the appropriate antenna.

SUMMARY

Conventional mounting devices for securing a GPS receiver antenna onto a GMM yield disadvantages addressed by various exemplary embodiments of the present invention. In particular, various exemplary embodiments provide a bracket for mounting a GPS-receiving antenna onto a well disposed on a gun turret. The antenna has an exposed dome and a connector extending underneath the dome.

The bracket includes a substantially cylindrical housing containing an internal chamber. The housing has proximal and distal ends along a longitudinal axis. The distal end has a first surface for attaching to the well. A flange disposed at the proximal end provides a surface onto which the antenna mounts. The connector can be inserted into the chamber. A male-threaded boss extends from the distal end to insert into a female-threaded well disposed on the turret.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
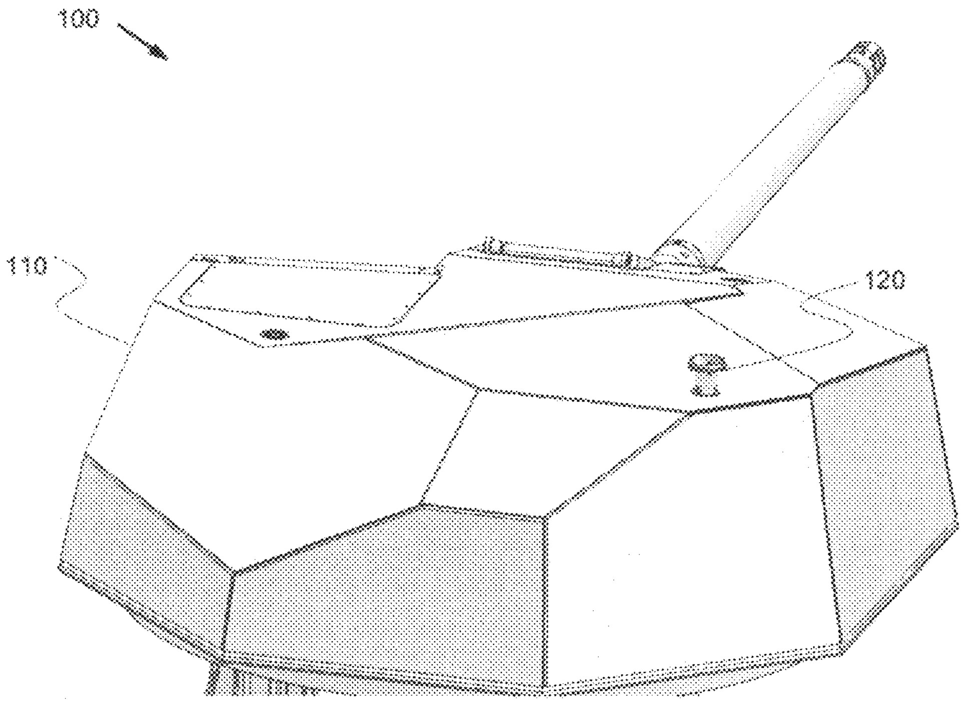
FIG. 1 is a perspective view of a ship turret.

FIG. 1 shows an isometric view 100 of an Mk 46 turret 110 that provides weather protection for the GMM. An antenna mount 120 attaches to and protrudes externally from the turret 110. The Mk 46 is a Naval derivative of the 30 mm turret originally designed for the United States Marine Corps Expeditionary Fighting Vehicle.

Figure 2:
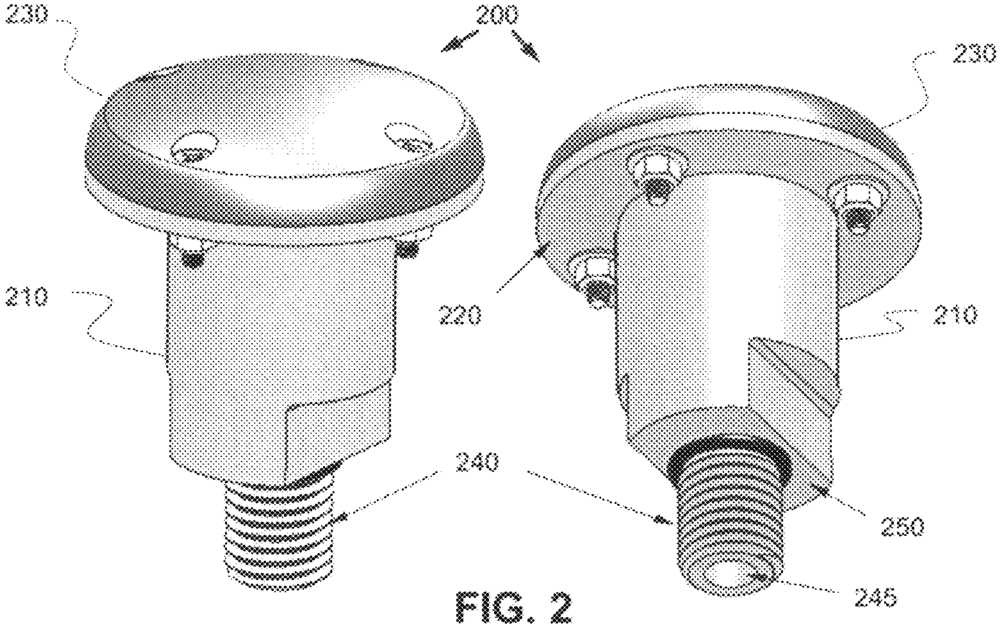
FIG. 2 is a pair of elevation views of an exemplary antenna bracket.

FIG. 2 shows perspective views 200 of the mount 120. A cylindrical bracket 210 includes an annular surface 220 to the turret 110. The bracket 210 is preferably composed of AISI C1018 alloy steel, although other materials having the appropriate mechanical properties can be used. A receiver dome antenna 230 constitutes the S67-1575-76 GPS aircraft antenna disposed on the proximal end of the bracket 210. The bracket 210 includes a male-threaded boss 240 disposed on the distal end. An annular cavity 245 extends into the bracket 210 from a mounting surface 250 at the bracket's distal end.

The dome antenna 230, with an outer diameter of 3.5 inches and a dome height of 0.70 inch, is available from Sensor Systems Inc. in Chatsworth, Calif., as described at http://www.sensorantennas.com/antenna_pdf/GPS/1575-14,76,86,96.pdf. The dome antenna 230 weighs 7 oz and is composed of 6060-T6 aluminum and thermoset plastic, and covered with Skydrol-resistant enamel for protection from external weather exposure.

Figure 3:
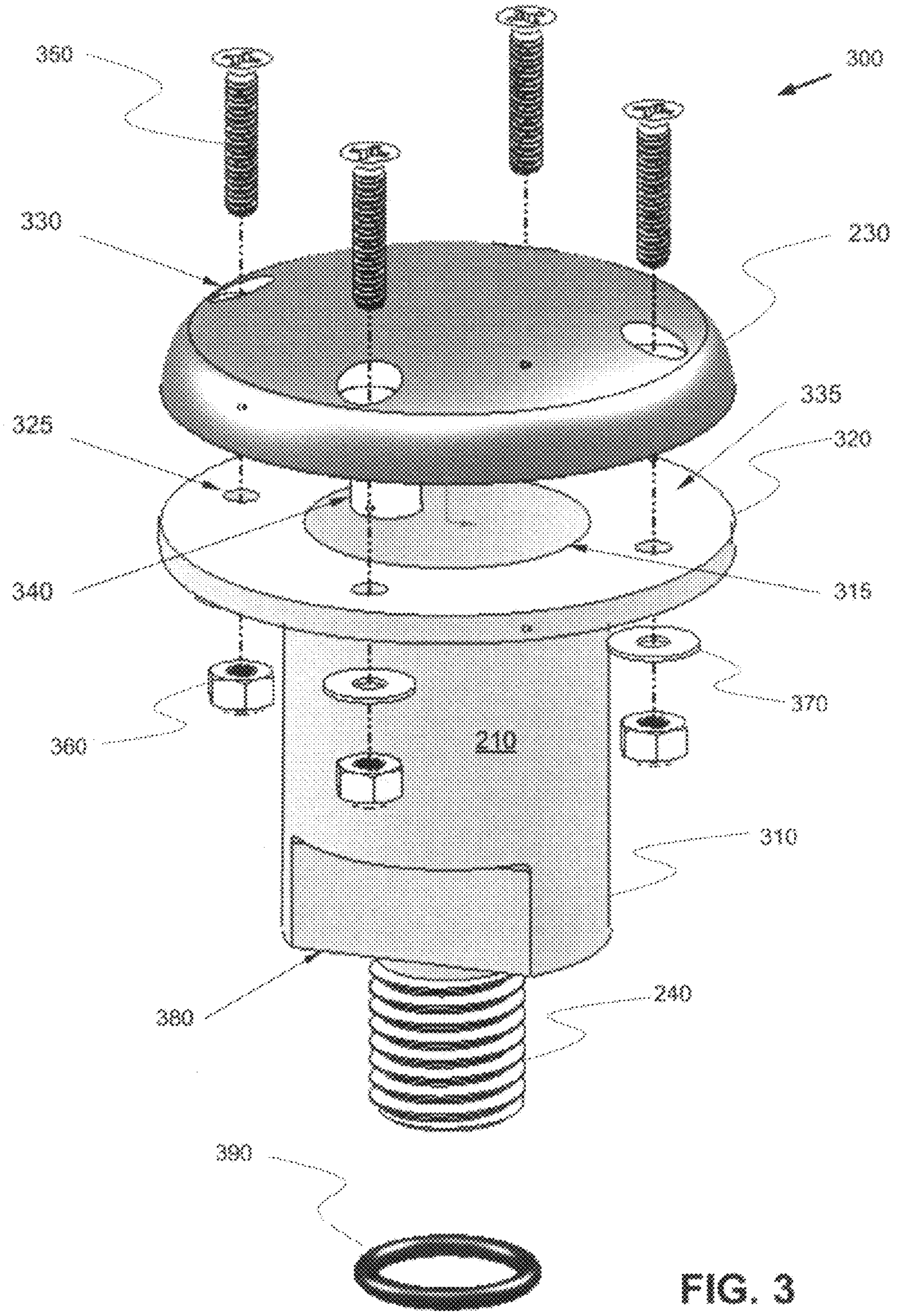
FIG. 3 is an isometric exploded view of the bracket components.

FIG. 3 shows a perspective exploded view of the mount's components. The bracket 210 includes a cylindrical housing 310 that defines an annular chamber 315. The housing 310 has an exemplary outer diameter of 2.0 inches. At the bracket's proximal end, a flange 320 at the proximal end having a plurality of through-holes 325. The flange 320 and the boss 240 are disposed at opposing ends of the bracket 210 along its longitudinal axis.

The bracket 210 has an exemplary total length of 3.869 inches, including the flange 320 and the boss 240. The antenna 230 secures to the flange 320 by a corresponding series of through-holes 330 co-axial with the flange holes 325. These holes 325 and 330 can be arranged, as shown, in a cruciform pattern with opposing centerlines separated by 2.686 inches.

A threaded Neill Concelman (TNC) connector 340 protrudes beneath the antenna 230. The TNC connector 340 has an impedance of 50Ω for connecting a coaxial cable to the GPS antenna 230. A plurality of #10 threaded bolts 350 (four shown in the exemplary cruciform configuration) pass through the holes 330 and 325 to be secured by corresponding nylon lock nuts 360, each nut 360 being separated from directly contacting the surface 220 by a corresponding washer 370. An opposing pair of flat surfaces 380 chamfers 0.375 inch from opposing sides of the outer diameter of the bracket 210 near its distal end for alignment to the turret 210. An o-ring 390 provides a water-tight seal between the bracket's distal end and the threaded boss 240.

Figure 4:
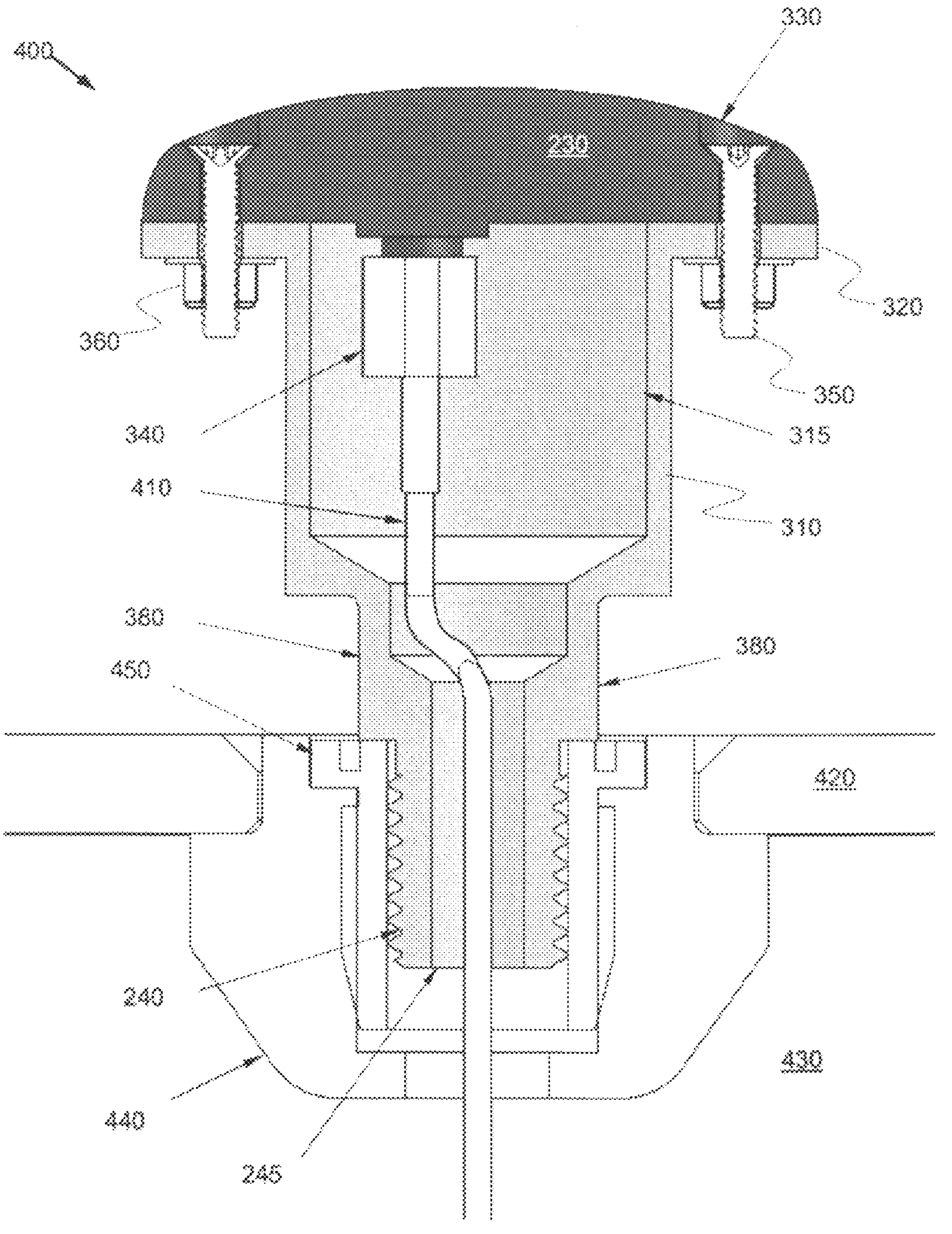
FIG. 4 is an elevation assembly view of the bracket as mounted.

FIG. 4 shows an elevation view 400 of the mount 120. The dome antenna 230 is shown bolted to the flange 320 of the bracket 210. The TNC connector 340 extends into the chamber 315. A coaxial cable 410 attaches to the connector 340 from within the chamber 315.

The turret 110 includes a cover 420 for protecting the GMM interior 430. The cover 420 includes at least one opening in which an insert 440 can be attached. At the surface 250, the bracket 210 attaches to a female-threaded well 450 within the insert 440. The boss 240 threadably inserts into the well 450. The cable 410 passes through the chamber 315 and emerges through the cavity 245 into the interior 430 for communication with the GMM's guidance and control equipment. The cable 410 also passes through a longitudinal opening of the insert 440 into the turret's interior.

Various exemplary embodiments provide techniques to mount a Sensor Systems S67-1575-76 GPS Antenna onto the General Dynamics Mk 46 turret for the GMM. This device was designed to provide a mounting platform for a GPS antenna 230 onto the Mk46 turret 110. This process enables direct passage of the coaxial cable 410 attached to the antenna 230 into the turret 110 through the bracket 210. Such direct connection of the cable 410 to the TPC connector 340 on the antenna 230 eliminates the hazard of cable twist that can impose signal loss. There is no known GPS antenna bracket for the Mk 46 turret that allows for the GPS coaxial cable to be passed directly into the turret through the bracket.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A package for mounting an antenna onto a gun turret, said antenna having an exposed dome and a connector extending underneath said dome that connects to a coaxial cable, said package comprising:

a well attaching to the turret and having female threads; and a bracket including a housing, a flange and a boss, said housing being substantially cylindrical and containing an internal chamber, said housing having proximal and distal ends along a longitudinal axis, said distal end having a surface, said flange disposed at said proximal end for mounting the antenna, wherein said connector inserts into said chamber, and said boss extending from said distal end, said boss having male threads; and a well having a longitudinal cavity, said well attaching to the turret and having said female threads for receiving said boss, wherein the cable passes through said cavity and connects to the connector of the antenna.

2. The bracket according to claim 1, wherein the antenna attaches to said flange by a plurality of threaded bolts secured by corresponding nuts.

* * * * *